(12) United States Patent
Schuster

(10) Patent No.: US 10,259,532 B2
(45) Date of Patent: Apr. 16, 2019

(54) CONTROLLING A TRANSMISSION WITH SEGMENTED WHEELS BY MEANS OF ELECTRONIC CONTROL ELEMENTS

(71) Applicant: Gregor Schuster, Baden (AT)

(72) Inventor: Gregor Schuster, Baden (AT)

(73) Assignee: Praxis Works LLC, Santa Cruz, CA (US)

( * ) Notice: Subject to any disclaimer, the term of this patent is extended or adjusted under 35 U.S.C. 154(b) by 0 days.

(21) Appl. No.: 15/507,656

(22) PCT Filed: Sep. 1, 2015

(86) PCT No.: PCT/AT2015/000115
§ 371 (c)(1),
(2) Date: Feb. 28, 2017

(87) PCT Pub. No.: WO2016/033623
PCT Pub. Date: Mar. 10, 2016

(65) Prior Publication Data
US 2017/0283006 A1 Oct. 5, 2017

(30) Foreign Application Priority Data

Sep. 1, 2014 (AT) .................................. A 669/2014

(51) Int. Cl.
*B62M 9/14* (2006.01)
*B62M 25/08* (2006.01)
(Continued)

(52) U.S. Cl.
CPC ................ *B62M 9/14* (2013.01); *B62M 1/36* (2013.01); *B62M 9/08* (2013.01); *B62M 25/08* (2013.01)

(58) Field of Classification Search
CPC .......... B62M 9/04; B62M 9/08; B62M 9/085; B62M 9/132; B62M 9/134
See application file for complete search history.

(56) References Cited

U.S. PATENT DOCUMENTS

| | | |
|---|---|---|
| 4,127,038 A | 11/1978 | Browning |
| 4,580,997 A | 4/1986 | Browning et al. |

(Continued)

FOREIGN PATENT DOCUMENTS

| | | |
|---|---|---|
| AT | 510 717 A4 | 6/2012 |
| CH | 617 992 A5 | 6/1980 |

OTHER PUBLICATIONS

International Search Report for PCT/AT2015/000115 dated Nov. 6, 2015; English translation submitted herewith (5 pages).

*Primary Examiner* — Kevin Hurley
(74) *Attorney, Agent, or Firm* — Kolitch Romano LLP

(57) ABSTRACT

The control device is for controlling a transmission ratio between a traction means and a wheel set rotatable about a wheel axle and including at least two wheel blades alternatively wrapped around by the traction means. At least one of the wheel blades is composed of several independently adjustable wheel rim segments. The adjustment of the wheel rim segments in relation to a fixed plane ("plane of alignment") in which the traction means wraps around the wheel set is effected by the control device in a direction substantially transverse to the plane of alignment. The control device includes at least one electrically actuatable control element, in particular a servomotor, provided that the at least one control element is arranged to rotate with the at least two wheel blades.

18 Claims, 5 Drawing Sheets

(51) Int. Cl.
  *B62M 1/36*  (2013.01)
  *B62M 9/08*  (2006.01)

(56) References Cited

U.S. PATENT DOCUMENTS

| | | | |
|---|---|---|---|
| 6,431,573 B1 * | 8/2002 | Lerman | B62M 1/36 280/261 |
| 9,499,233 B2 * | 11/2016 | Schuster | B62M 9/08 |
| 2002/0084618 A1 | 7/2002 | Lerman et al. | |
| 2014/0248982 A1 | 9/2014 | Schuster | |

* cited by examiner

CONTROLLING A TRANSMISSION WITH SEGMENTED WHEELS BY MEANS OF ELECTRONIC CONTROL ELEMENTS

CROSS-REFERENCE TO RELATED APPLICATIONS

This application is a U.S. national phase application filed under 35 U.S.C. § 371 of International Application No. PCT/AT2015/000115, filed Sep. 1, 2015, designating the United States, and claims priority from Austrian Patent Application No. A 669/2014, filed Sep. 1, 2014, and the complete disclosures of which applications are hereby incorporated herein by reference in their entirety for all purposes.

FIELD OF THE INVENTION AND TECHNOLOGICAL BACKGROUND

The invention relates to a control device of a transmission ratio between a traction means and a wheel set rotatable about a wheel axle and including at least two wheel blades alternatively wrapped around by the traction means, wherein at least one of the wheel blades is composed of several independently adjustable wheel rim segments, wherein the adjustment of the wheel rim segments in relation to a fixed plane ("plane of alignment") in which the traction means wraps around the wheel set is effected by the control device in a direction substantially transverse to the plane of alignment, wherein the control device comprises at least one electrically actuatable control element, in particular a actuator.

A control device of this type is, for instance, described in US 2002/0084618 A1.

Various solution principles are known for actuating changeable transmissions with wheel rim segments.

There, mechanical control elements each associated to a wheel rim segment are moved one by one by running onto a stationary switch or ramp so as to enforce their movements, and hence movement of the wheel rim segments. Such control elements may, for instance, be designed as eccentrics moving the segment into and out of the operating range, or of wedges causing such movement by axial displacement.

Likewise known are solutions in which the movements of all wheel segments are simultaneously triggered by a central control device rotationally decoupled from the stationary actuator. In those cases, the control members are preloaded by an energy accumulator, in particular a spring element, and the wheel segments are prevented from their adjustment movements until the correct shifting moment has been reached, whereupon the adjustment will take place under the action of the energy accumulator.

Some solutions are based on the principle of temporarily moving the divided, segmented or interrupted sprockets only during the shifting operation itself in order "to bring" the chain to the next-larger or next-smaller diameter. Such solutions are, for instance, described in U.S. Pat. No. 4,127,038 or U.S. Pat. No. 4,580,997. There, the chain is brought into alignment with the consecutive chain blade by pivoting in or axially moving the larger or smaller adjacent chain blade sector. The alignment of the chain thus changes with a change of the transmission ratio.

CH 617 992 A5 discloses a principle by which the chain segments are gradually brought into alignment with the chain. The chain blade segments are individually mounted on a corotating device by means of pins. This enables a smaller construction. It will thus be basically possible to construct derailleur gears that provide the entire spectrum of transmission ratios on a single axis.

In all of the presently known principles, the adjustment of the wheel rim segments is accomplished by the mechanical power transmission between a part of the control device corotating with the wheel rim segments and a non-corotating part of the control device. The non-corotating part is, for instance, fastened to the bicycle frame and performs an adjustment stroke that causes the adjustment of the wheel rim segments during the rotation by the appropriate cooperation with a corotating part of the control device. This involves the drawback of causing constant mechanical contact, and hence friction, during the operation of the system. In addition to undesired stress and wear, this will also lead to the generation or noise and require the observance of exact manufacturing tolerances and high adjustment expenditures during assembling. Such principles are thus expensive in practice, rendering assembly difficult.

From the prior art, both manually operable control devices and electrically operable control devices are known. An electrically operable control device for a transmission gear with segmented sprockets is, for instance, described in US 2202/0084618 A1, which, however, involves the same drawbacks in terms of power transmission from a stationary to a corotating part of the control device as explained above in connection with manually operable control devices. Moreover, electric control devices for conventional derailleur gears are known, yet also these have the disadvantage that a derailleur mounted to the stationary part (e.g. bicycle frame) enforces a change of the traction medium between the undivided wheel blades. Here too, an interface between rotating and stationary units is provided.

BRIEF DESCRIPTION OF THE INVENTION

It is, therefore, the object of the invention to overcome the initially mentioned drawbacks, departing from the approach of using segmented, divided and/or interrupted sprockets. In particular, a control device of the initially mentioned kind is to be provided, which does not require any stationary unit for the shifting operation.

To solve this object, it is provided according to the invention that the at least one control element is arranged to rotate with the at least two wheel blades.

By the use of electrically actuated control elements designed according to the invention for moving the sprocket segments, the drawbacks of the initially mentioned approaches have been overcome. The mechanical interface between stationary and rotating units is omitted. Consequently, hitherto existing tolerance problems are obviated, which might lead to undesired contacts or shifting operations at movements of the rotating unit, and distortions caused by the drive, power or output power. Likewise, mounting expenditures are considerably reduced, since the whole device only comprises one independently functioning unit. Furthermore, the actuation of such units can be performed without the use of rod assemblies or cables, which are subject to wear and both temperature and age-related changes in length. The otherwise existing requirement for readjustment is therefore obviated.

In a preferred manner, it is provided that the at least one control element is arranged to effect a travel by closing an electric circuit, and thereby move at least one wheel rim segment, or a block thereof, into or out of its operating range.

Furthermore, it is preferably provided that a separate, corotating and electrically actuatable control element is associated to each wheel rim segment. This enables in a simple manner the separate actuation of the adjustment movement of each individual wheel rim segment.

The movement of the wheel rim segment caused by the electric actuating element can only occur in that region where the traction means is not present on the wheel rim segment, or must not be initiated where the first wheel rim segment has just passed the approaching traction medium. This requires the recognition of the region suitable for the adjustment of the individual wheel rim segments. The wheel rim segments of a wheel blade in the control device architecture according to the invention are thus adjusted not all at the same time, but preferably one after the other. It is thus advantageous to provide a suitable actuation of the adjustment movement of the individual wheel rim segments. In a configuration in which a separate corotating control element is associated to each of the wheel rim segments, such an actuation can preferably be performed in that a sensor is associated to each control element, which sensor is arranged to interrogate the presence of the traction means on a defined position and actuate the associated control element with a negative interrogation. Alternatively, this may happen in that a sensor directly interrogates the presence of the traction medium on the rotating unit itself so as to trigger the shifting operation of the associated wheel segment upon negative interrogation.

In view of the conversion of the actuating movement of the at least one control element, such as the rotational movement of the control motor, into the adjustment movement of the individual wheel rim segments, known mechanisms can be employed. In a preferred configuration, it is provided that the at least one control element is connected to a threaded spindle in drive terms, wherein the spindle cooperates with a nut rotationally fast with the respective wheel rim segment, in order to effect the actuation process by screwing the nut in or out.

Alternatively, it is provided that the at least one control element is connected to a threaded spindle in drive terms, wherein the threaded spindle cooperates with a nut such that the wheel rim segments are moved into or out of their operating range by respectively screwing in or out the nut, which is connected to an eccentric.

In order to reduce the expenditures involved in the provision of a number of control elements corresponding to the number of wheel rim segments, a preferred configuration contemplates that a single control element is used, which is preferably arranged centrally, in particular in the region of the axis of rotation of the wheel blades. The central control element may, for instance, be arranged to perform a rotation about the axis of rotation of the wheel blades or a linear movement along the axis of rotation of the wheel blades.

In order to achieve a suitable sequential actuation of the adjustment of the individual wheel rim segments in a configuration comprising a single control element, it is preferably provided that the control element cooperates with at least one energy accumulator, in particular a spring element, to charge or preload the same, wherein the charged energy accumulator exerts an adjusting force on the at least one wheel rim segment, the adjustment of the at least one wheel rim segment being prevented until the wheel rim segment is in the non-wrapped-around region of the traction means.

In this respect, it is preferably provided that a separate energy accumulator, in particular a spring element, is associated to each wheel rim segment to cooperate with the centrally arranged, corotating, electrically driven control element for simultaneously charging the energy accumulators of all wheel rim segments.

It is preferably provided that the centrally arranged control element cooperates with the energy accumulators via a cam disc, said cam disc comprising a cam elevation for each of the energy accumulators.

In a preferred configuration, a central control element is provided, which is devised to drive a spindle of each individual wheel rim segment via a friction clutch so as to actually not move the same until the actuating movement has been enabled by a mechanical element. The mechanical element thus detects the presence of the traction means, allowing movement only when the traction means has left the region in question.

The control elements, on the one hand, may preferably be comprised of control motors, which accomplish the movement of the wheel rim segments either directly or via a lifting spindle, an eccentric or wedges, and block the same in their operating positions such that the wheel rim segments will be fixed in said positions following the adjusting operation, until the control motor, or the lifting spindle, the eccentric or the wedge, respectively, will be moved again, thus releasing the fixation.

On the other hand, the at least one control element may also be comprised of an electrically operated lifting magnet. The lifting magnet causes the movement and fixation of the wheel rim segments either directly or via an eccentric or wedge.

In a particularly preferred manner, it is provided that the voltage supply of the electric control elements is disposed on the rotating unit. This will provide a closed system capable of being inserted into the bicycle frame without interface and without any adjustment work. On the one hand, this will considerably reduce mounting expenditures and, on the other hand, this will prevent possible maladjustment of the control mechanics so as to avoid readjustment and enable shifting always at the optimum moment. This is of particular advantage in bicycles with spring-loaded chainstays, because the free part of the chain will change by deflection. In particular, a corotating electronic control unit and a voltage supply are preferably provided.

Alternatively, it is provided that the at least one control element is connected to a voltage supply via a slip ring contact. In this case, it is provided in a particularly preferred manner that the at least one control element is actuated by the closing of a contact to the stationary voltage supply, which is caused in the rotating movement.

It is preferably provided that the control device is configured as an autonomously functioning unit capable of contactlessly receiving the command for actuating the corotating electric control elements. The configuration in this case is preferably devised such that the electronic control unit comprises a receiving circuit for receiving wirelessly transmitted control signals for the control device. The wireless signal transmission of control commands for the at least one control element may, in particular, be effected via radio transmission, wherein conventional transmission standards may be adopted. The transmitter device for transmitting the control signals may, for instance, be incorporated in an actuation device attached to the handlebars of a bicycle.

In a preferred manner, a sensor system is provided, which is arranged to measure the rotation speed and/or the driving force, and hence automatically effect a gear change. The configuration in this case is preferably devised such that a measuring device for detecting the rotation speed and/or the driving force is provided, said measuring device cooperating with a control device for actuating the at least one control element as a function of the detected rotation speed and/or driving force, respectively. The control device according to the invention thus is preferably configured as an automatic transmission comprising a suitable sensor system. When interrogating the speed and load, it is thus possible to effect an automatic gear change initiated by the electronic system upon as a function of these parameters.

The control mechanism according to the invention is particularly suitable for a gear shift in which the control mechanism is mounted to a gear wheel, for instance a gear wheel that serves as a drive wheel of a bicycle gearing.

However, the control elements according to the invention can also be used on a driven wheel, which in turn may constitute the drive wheel of a vehicle, in particular bicycle.

BRIEF DESCRIPTION OF THE DRAWINGS

In the following, the invention along with further particulars and advantages will be explained in more detail by way of non-limiting exemplary embodiments of the invention, which are illustrated in the accompanying drawings. These show.

DETAILED DESCRIPTION OF EXEMPLARY EMBODIMENTS OF THE INVENTION

Figure 1:
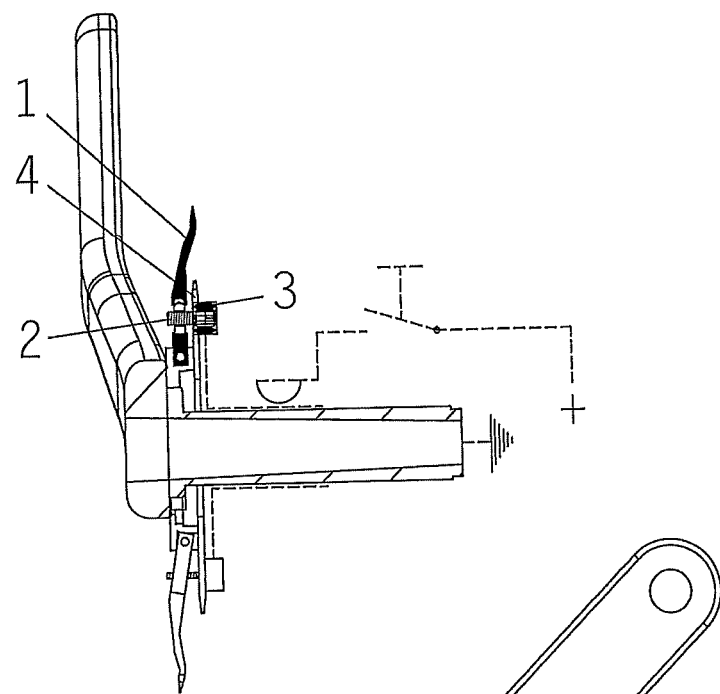
FIG. 1 illustrates a control mechanism comprising an undivided, small sprocket and four pivotally mounted sprocket segments each including a control motor moving the sprocket segments via a lifting spindle.

A first aspect of the invention avoids contact, as far as possible, between stationary and rotating units in that the mechanical system on a stationary point, which performs the displacement of the sectored, divided or interrupted sprockets, is omitted. The control mechanism in FIG. 1 shows wheel rim segments 1, which are moved into and out of their range of operation by rotating a spindle 2. The rotational movement is effected by switching on and off, or changing the direction of, a control motor 3 per wheel rim segment 1, which is supported on a fixed part, i.e. the small and undivided sprocket 4 in the present case. The associated control motor 3 is energized when contact to the stationary voltage supply has been established by the rotational movement.

Figure 2:
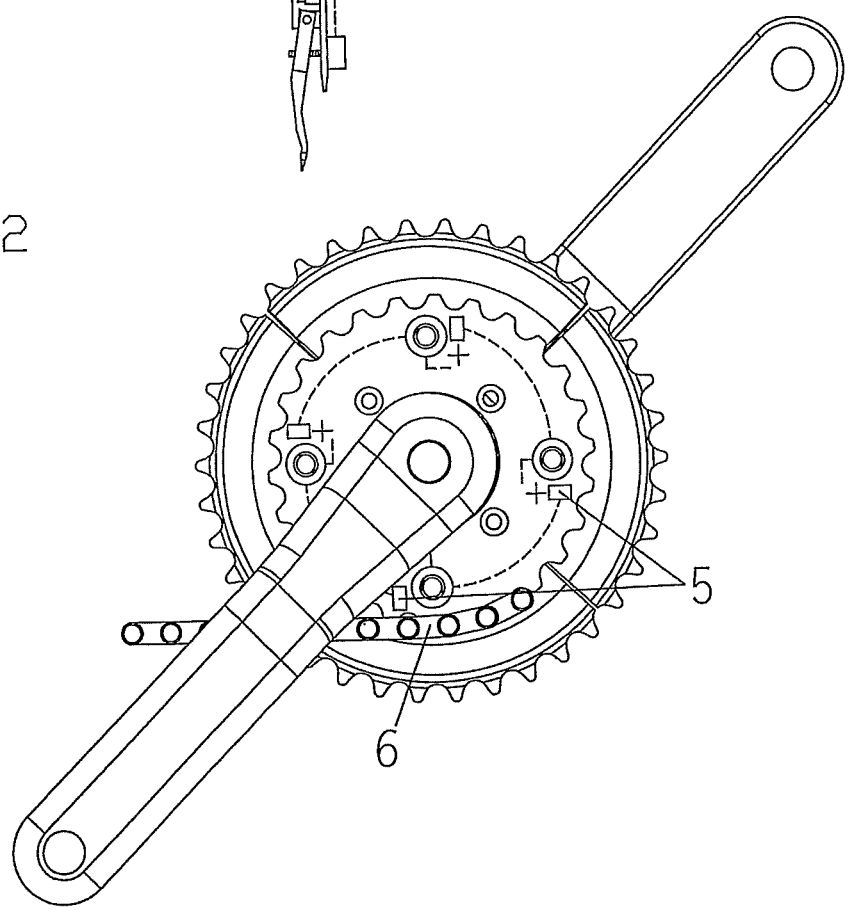
FIG. 2 is a front view of a control device according to a first exemplary embodiment, comprising sensors interrogating the presence of the chain.

FIG. 2 depicts a configuration according to FIG. 1, yet a sensor 5 per control motor 3, which interrogates the presence of the chain 6, is attached in such a manner that the control movement, or power-up of the control motor 3, or beginning of the adjusting operation of the wheel rim segment 1, will start at the right moment, so that the wheel rim segment 1 is adjusted only when it is in the non-wrapped-around region of the traction means 6.

Figure 3:
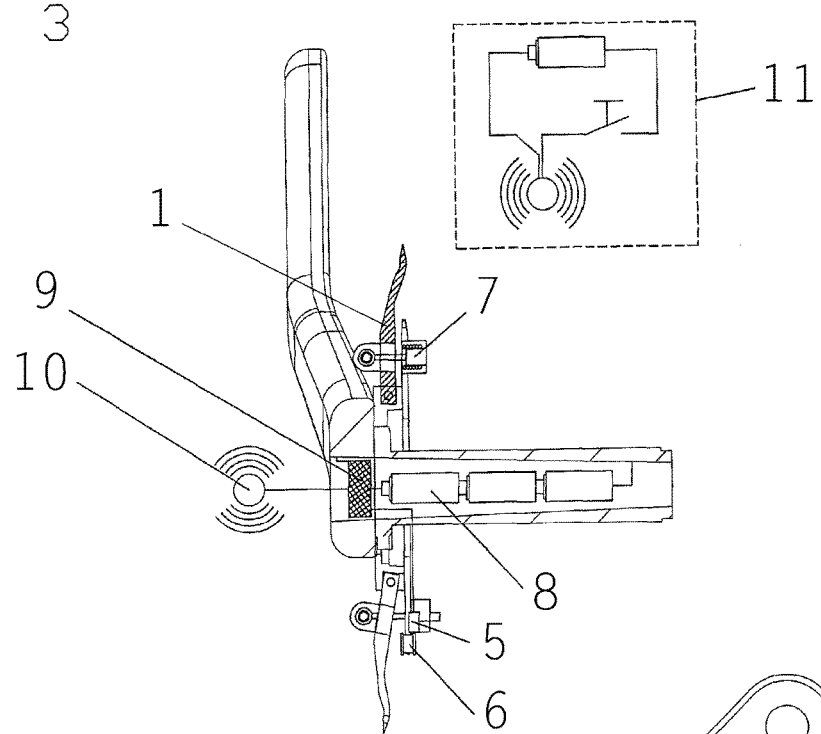
FIG. 3 depicts the control mechanism according to FIG. 1, comprising a lifting magnet per sprocket segment, which directly moves the latter and is supplied and actuated via a corotating control unit and voltage supply without connection to the stationary unit.

FIG. 3 illustrates a preferred embodiment comprising a lifting magnet 7 for each wheel rim segment 1, which moves the wheel rim segment 1 directly into and out of its operating position. A corotating voltage supply 8 and electronics 9 are contactlessly actuated via radio 10 by a transmitter 11. A sensor 5 interrogates the presence of the traction means 6, and the adjusting operation per wheel rim segment 1 is accomplished at the appropriate time during rotation, when the wheel rim segment 1 is in the non-wrapped-around region of the traction means 6.

Figure 4:
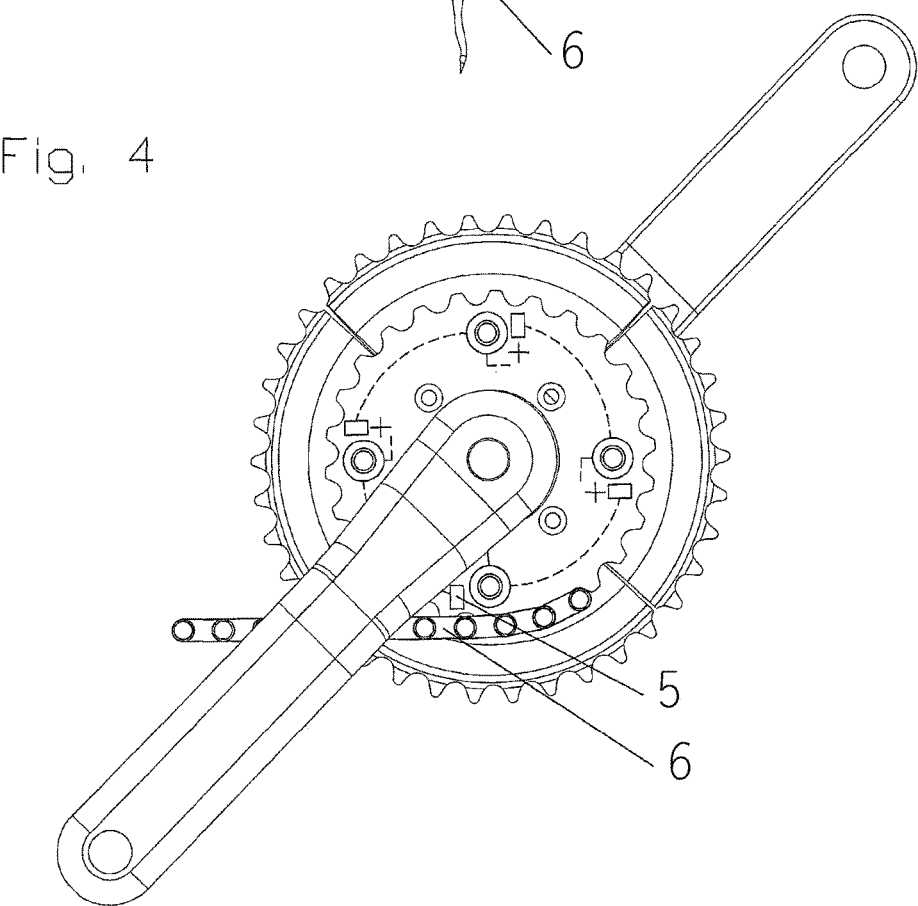
FIG. 4 is a front view of the control mechanism according to FIG. 3.

FIG. 4 depicts the front view of FIG. 3.

Figure 5:
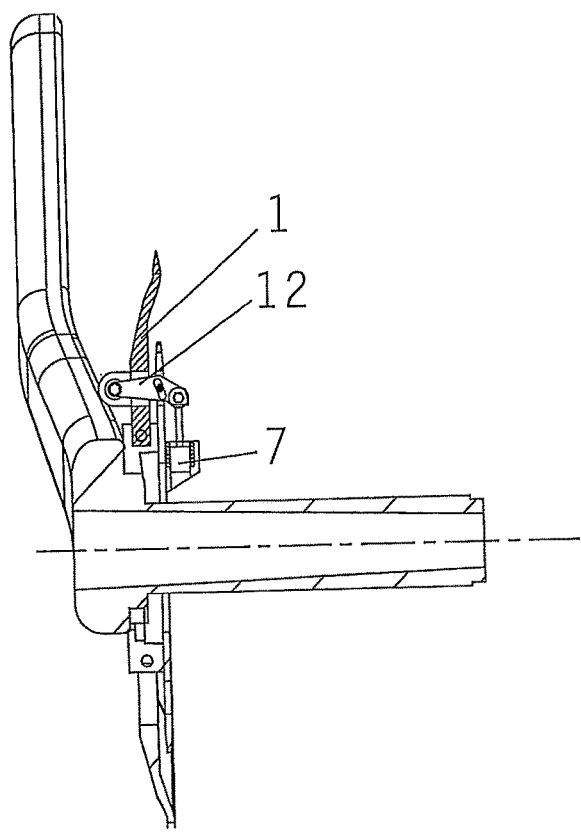
FIG. 5 depicts a control mechanism according to FIG. 1, comprising a lifting magnet per sprocket segment to move the latter via an eccentric lever.

FIG. 5 illustrates an embodiment comprising sprocket segments 1, which are forced to movement by a lifting magnet 7 via a lever 12. This embodiment enables the use of a lifting magnet 7 which, not energized in its end position, has no power to fix the wheel rim segment 1, since self-locking occurs due to an advantageous shape of curve. The respective wheel rim segment 1 will thus be fixed in its respective end position.

Figure 6:
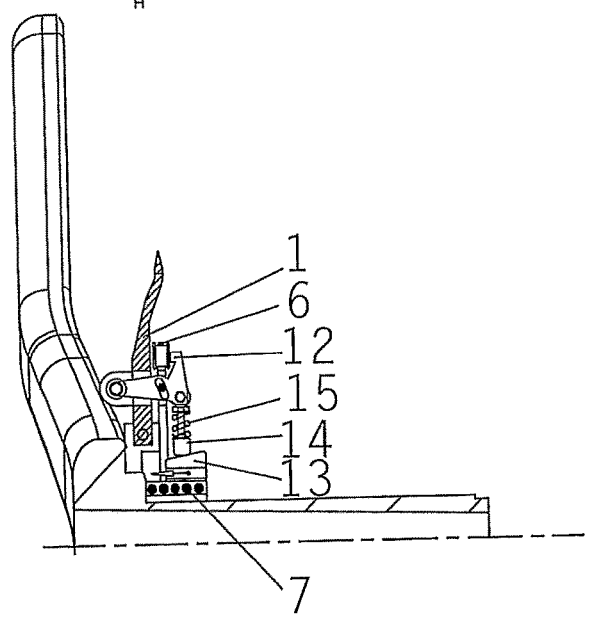
FIG. 6 depicts a control mechanism according to FIG. 1, comprising a single central, annular lifting magnet disposed about the shaft and moving the sprocket segments each via an eccentric lever.

FIG. 6 illustrates an embodiment comprising a central annular lifting magnet 7 disposed about the axis of rotation and actuating a tappet 14 per wheel rim segment 1 via a wedge-shaped ring 13 by changing position between two axial end positions, which tappet will, in turn, not perform the movement of the lever 12 via an intermediate spring accumulator 15 before the chain 6 has left the small sprocket.

Figure 7:
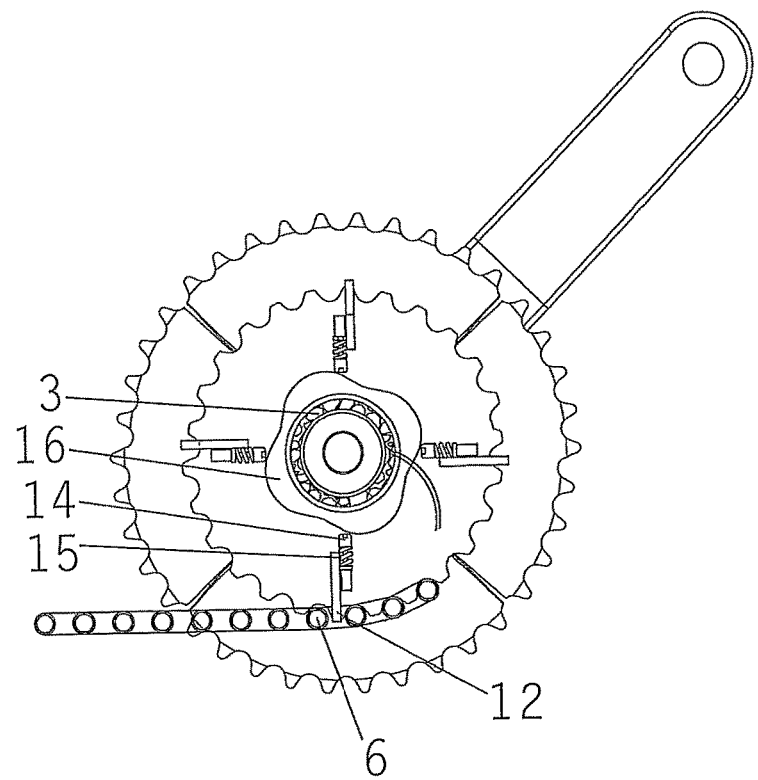
FIG. 7 depicts a control mechanism according to FIG. 1, comprising a single central, annular lifting magnet disposed about the shaft and moving the sprocket segments via a cam disc and an eccentric lever each.

FIG. 7 illustrates an embodiment according to FIG. 6, yet the tappets 14 are actuated by a control motor 3 disposed centrally about the shaft and via a cam disc 16. The mechanical interrogation of the presence of the chain 6 in this case is accomplished by a protrusion on the lever 12.

Figure 8:
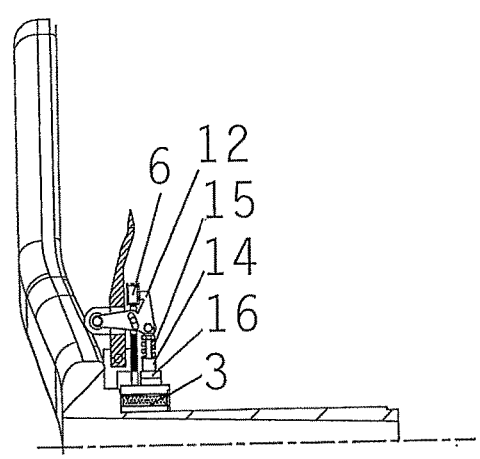
FIG. 8 illustrates the control mechanism of FIG. 7 in front view.

FIG. 8 is a front view of the arrangement according to FIG. 7.

Figure 9:
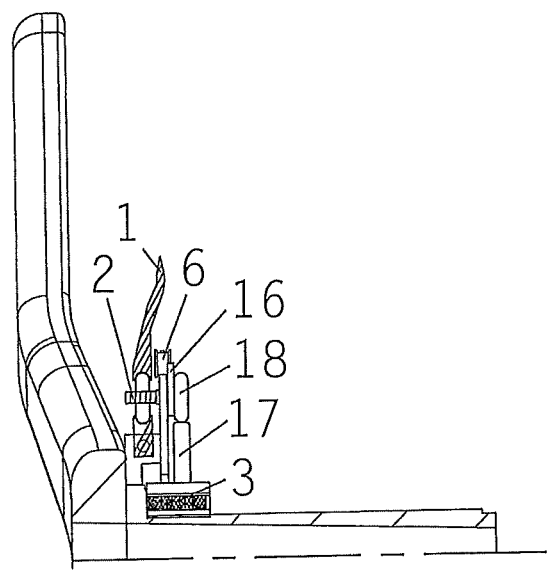
FIG. 9 depicts a control mechanism according to FIG. 1, comprising a single central, annular control motor disposed about the shaft and moving the sprocket segments via friction wheels.

FIG. 9 illustrates an embodiment comprising a central control motor 3 driving a first friction wheel 17, which in turn drives a second friction wheel 18 in a frictionally engaged manner, which second friction wheel, while connected to a spindle 2, moves the sprocket segment 1. The cam disc 16 prevents the second friction wheel 18 from moving, and hence adjusting the wheel rim segment 1, until the chain 6 has left the region of the small sprocket.

Figure 10:
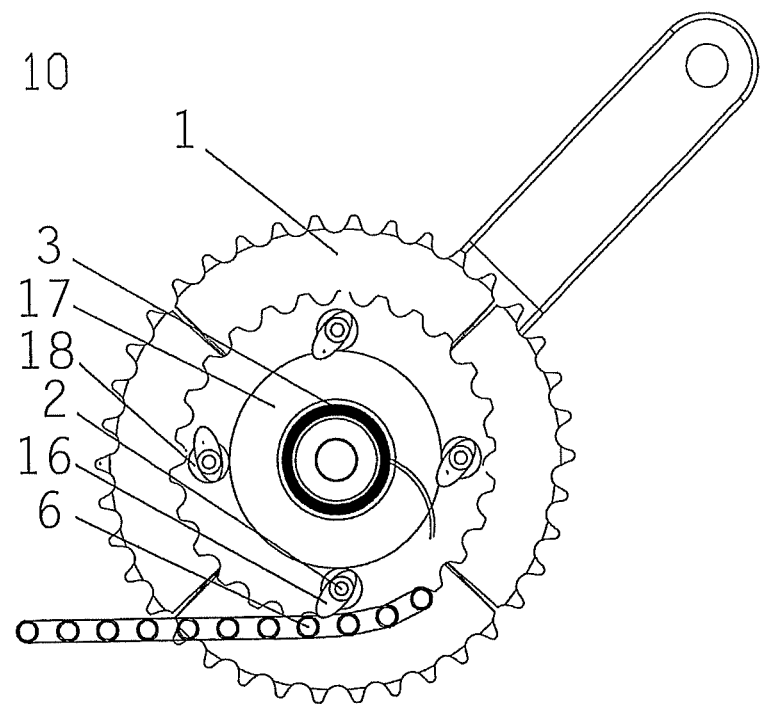
FIG. 10 is a front view of the control mechanism according to FIG. 9.

FIG. 10 is a front view of the arrangement according to FIG. 9.

It goes without saying that the aspects and embodiments of the invention shown and described herein, and their particulars, can be combined with one another.

The invention claimed is:

1. A control device of a transmission ratio between a traction means and a wheel set rotatable about a wheel axle and including at least two wheel blades alternatively wrapped around by the traction means, wherein at least one of the wheel blades is composed of several independently adjustable wheel rim segments, wherein the control device comprises at least one electrically actuatable control element characterized in that the at least one control element is arranged to rotate with the at least two wheel blades, and wherein the control device effects adjustment of the wheel rim segments in relation to a fixed plane, which fixed plane defines a plane of alignment, in which the traction means wraps around the wheel set in a direction substantially transverse to the plane of alignment.

2. A control device according to claim 1, wherein the at least one control element is arranged to effect a travel by closing an electric circuit, and thereby move at least one wheel rim segment, or a block thereof, into or out of its operating range.

3. A control device according to claim 1, wherein a separate, corotating and electrically actuatable control element is coupled to each wheel rim segment.

4. A control device according to claim 1, wherein the control device further comprises a sensor is associated to each control element, which sensor is arranged to interrogate the presence of the traction means on a defined position and actuate the associated control element with a negative interrogation.

5. A control device according to claim 1, wherein the at least one control element is connected to a threaded spindle in drive terms, wherein the spindle cooperates with a nut rotationally fast with the respective wheel rim segment, in order to effect the actuation process by screwing the nut in or out.

6. A control device according to claim 1, wherein the at least one control element is connected to a threaded spindle in drive terms, wherein the threaded spindle cooperates with a nut such that the wheel rim segments are moved into or out of their operating range by respectively screwing in or out the nut, which is connected to an eccentric.

7. A control device according to claim 1, wherein the control device further comprises at least one energy accumulator and the at least one control element cooperates with the at least one energy accumulator to charge or preload the same, wherein the charged energy accumulator exerts an adjusting force on the at least one wheel rim segment, the adjustment of the at least one wheel rim segment being prevented until the wheel rim segment is in the non-wrapped-around region of the traction means.

8. A control device according to claim 7, wherein each energy accumulator is associated to each wheel rim segment to cooperate with a centrally arranged, corotating, electrically driven control element for simultaneously charging the energy accumulators of all wheel rim segments.

9. A control device according to claim 8, wherein the centrally arranged control element cooperates with the energy accumulators via a cam disc, the cam disc comprising a cam elevation for each of the energy accumulators.

10. A control device according to claim 1, wherein the control device includes a central control element, which is devised to drive a spindle of the individual wheel rim segments via a friction clutch so as to actually not move the same until the actuating movement has been enabled by a mechanical element.

11. A control device according to claim 1, wherein the at least one control element is comprised of an electrically operated lifting magnet.

12. A control device according to claim 1, wherein the at least one control element is connected to a non-corotating voltage supply via a slip ring contact.

13. A control device according to claim 1, wherein the at least one control element is actuated by the closing of a contact to a stationary voltage supply, which is caused in the rotating movement.

14. A control device according to claim 1, wherein the control device further comprises a corotating electronic control unit for actuating the at least one control element, and an optionally corotating voltage supply for the at least one control element.

15. A control device according to claim 14, wherein the corotating electronic control unit comprises a receiving circuit for receiving wirelessly transmitted control signals for the control device.

16. A control device according to claim 1, wherein the control device further comprises a measuring device for detecting the rotation speed and/or the driving force, the measuring device cooperating with a control device for actuating the at least one control element as a function of the detected rotation speed and/or driving force, respectively.

17. A control device according to claim 1, wherein the at least one electrically actuatable control element comprises a servomotor.

18. A control device according to claim 7, wherein the at least one energy accumulator comprises a spring element.

* * * * *